United States Patent
Ketkar et al.

(10) Patent No.: US 7,480,726 B2
(45) Date of Patent: Jan. 20, 2009

(54) METHOD AND SYSTEM FOR ESTABLISHING COMMUNICATION BETWEEN AT LEAST TWO DEVICES

(75) Inventors: Vilas S. Ketkar, San Jose, CA (US); Shawn D. Moe, Leavenworth, KS (US); Lakshman R. Sakaray, Overland Park, KS (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/693,592

(22) Filed: Oct. 24, 2003

(65) Prior Publication Data

US 2005/0114512 A1 May 26, 2005

(51) Int. Cl.
*G06F 15/16* (2006.01)

(52) U.S. Cl. .................. 709/230; 709/231; 709/203; 709/227; 709/228; 379/100.17

(58) Field of Classification Search .................. 709/230
See application file for complete search history.

(56) References Cited

U.S. PATENT DOCUMENTS

| | | | |
|---|---|---|---|
| 5,621,894 A * | 4/1997 | Menezes et al. ............. 709/227 |
| 6,161,135 A | 12/2000 | Ehrlich et al. ............... 709/221 |
| 6,212,536 B1 | 4/2001 | Klassen et al. .............. 707/513 |
| 6,477,580 B1 | 11/2002 | Bowman-Amuah ......... 709/231 |
| 6,560,321 B1 * | 5/2003 | Chen et al. ............. 379/100.17 |
| 6,594,699 B1 * | 7/2003 | Sahai et al. .................. 709/228 |
| 6,795,863 B1 * | 9/2004 | Doty, Jr. ..................... 709/231 |
| 2003/0206580 A1 * | 11/2003 | Palm ......................... 375/222 |
| 2004/0043763 A1 * | 3/2004 | Minear et al. ............... 455/419 |
| 2005/0251631 A1 * | 11/2005 | Rowlands et al. ........... 711/145 |
| 2006/0034536 A1 * | 2/2006 | Ogren et al. ................ 382/254 |
| 2006/0239173 A1 * | 10/2006 | Zhang et al. ........... 369/124.12 |

* cited by examiner

*Primary Examiner*—Ario Etienne
*Assistant Examiner*—Barbara N Burgess
(74) *Attorney, Agent, or Firm*—Sawyer Law Group LLP

(57) ABSTRACT

The present invention is related to a method for communicating features supported by a device to at least one other device. The method includes providing a bit stream by the device, where at least one bit in the bit stream represents a feature supported by the device. In a second aspect, a method for establishing a communication session between at least two devices includes initiating communication between a first device and a second device, exchanging a bit stream associated with the first device and a bit stream associated with the second device, and identifying mutually supported features.

13 Claims, 2 Drawing Sheets

METHOD AND SYSTEM FOR ESTABLISHING COMMUNICATION BETWEEN AT LEAST TWO DEVICES

FIELD OF THE INVENTION

The present invention relates generally to computer systems and, more particularly, to a method and system for establishing a communication session between at least two devices.

BACKGROUND OF THE INVENTION

In a network environment, a plurality of clients are able to access one or more databases in the network. FIG. 1 is a block diagram of an exemplary network environment. Each client 10a-10n is generally represented by a computer system or work station connected to a network 20, e.g., via a LAN, WAN or other suitable means, and each database 16 is managed by a database server 14 that is also connected to the network 20. Each client 10a-10n and each database server 14 includes various application programming interfaces (APIs) 12a-12n that allow the client 10a and database 14 to communicate with one another.

When a client, e.g., 10a, attempts to access a database server 14 via an API 12a, e.g., Open Database Connectivity (ODBC), Object Linking and Embedded Database (OLEDB) or Java Database Connectivity (JDBC), many pieces of information are exchanged between the client API 12a and the server 14 in order for the connection to be successful. One such piece of information is a definition of a set of capabilities or features that are supported by the client API 12a and the server 14. The client SAPI 12a must understand the capabilities or features of the server 14, and vice versa, in order to exchange data correctly.

Several methods are currently used to exchange this information. In one such method, a client API 12a and a server 14 exchange a single integer value that represents the highest level of functionality, i.e., the newest feature, supported by the server 14 or the client API 12a. Thus, for example, the client API 12a might communicate to the server 14 that the highest level of functionality it supports is feature 321, and the server 14 might communicate to the client API 12a that its highest supported function is feature 325. The parties will then agree to communicate according to the level of functionality defined by feature 321.

Both parties assume that all features with a smaller feature number, e.g., features 300-320, have been implemented in the other party. This assumption, however, may be erroneous because features may be implemented separately and not necessarily sequentially. For example, although the client's highest supported functionality is feature 321, the API 12a may or may not support feature 317. If the server 14 utilizes feature 317 during its communication with the client 10a because the server 14 incorrectly assumes the client API 12a supports feature 317, the communication can be impaired.

To address this problem, the client API 12a can implement all intermediary features up to the highest feature. Nevertheless, implementing such features is costly, in both time and expense, and some if not all of the intermediary features may be irrelevant to the highest feature or to the client API 12a in general.

Accordingly, a need exists for a method and system that allows a first device, such as a client 10a, and a second device, such as a database server 14, to exchange information regarding their respective capabilities. The method and system should describe the capabilities, instead of implying them by, for example, a single integer. The method and system should also be efficient and cost effective. The present invention addresses such a need.

SUMMARY OF THE INVENTION

The present invention is related to a method for communicating features supported by a device to at least one other device. The method includes providing a bit stream by the device, where at least one bit in the bit stream represents a feature supported by the device. In a second aspect, a method for establishing a communication session between at least two devices includes initiating communication between a first device and a second device, exchanging a bit stream associated with the first device and a bit stream associated with the second device, and identifying mutually supported features.

Through the aspects of the present invention, a device provides a bit stream that indicates which features are supported by the device. Each bit represents the status of an individual feature. The device provides the bit stream to another device with which it wishes to establish communications and receives, in turn, the other device's bit steam. Presumably, the two bit streams adhere to the same structure, i.e., each bit in both bit streams correspond to the same feature. By comparing the respective bit streams, the two devices can agree to utilize the features they support in common. Accordingly, the highest common feature can be utilized without requiring both parties to implement all intermediary features.

DETAILED DESCRIPTION

The present invention relates generally to computer systems and, more particularly, to a method and system for establishing a communication session between at least two devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with the present invention, a bit stream is utilized to indicate the features supported by a device. Each bit represents an individual feature. If a bit is "on," i.e., the bit is a one (1), the corresponding feature is supported. If the bit is "off," i.e., the bit is a zero (0), the feature is not supported. According to the preferred embodiment of the present invention, a first device, e.g., a client API 12a, and a second device, e.g., a server 14, exchange their respective bit streams to indicate to one another their respective communication capabilities. Presumably, the bit streams for the first and second devices are structured such that each bit corresponds to the same feature in the first and second devices. For example, both devices understand that the fourth bit in both bit streams corresponds to one particular feature. By comparing the bit streams, commonly supported features are identified, and features between the first device and the second device can be defined quickly and accurately. By exchanging capabilities, a device can implement and utilize new features without having to implement each of the predecessor features that may not be relevant to the particular device.

Figure 1:
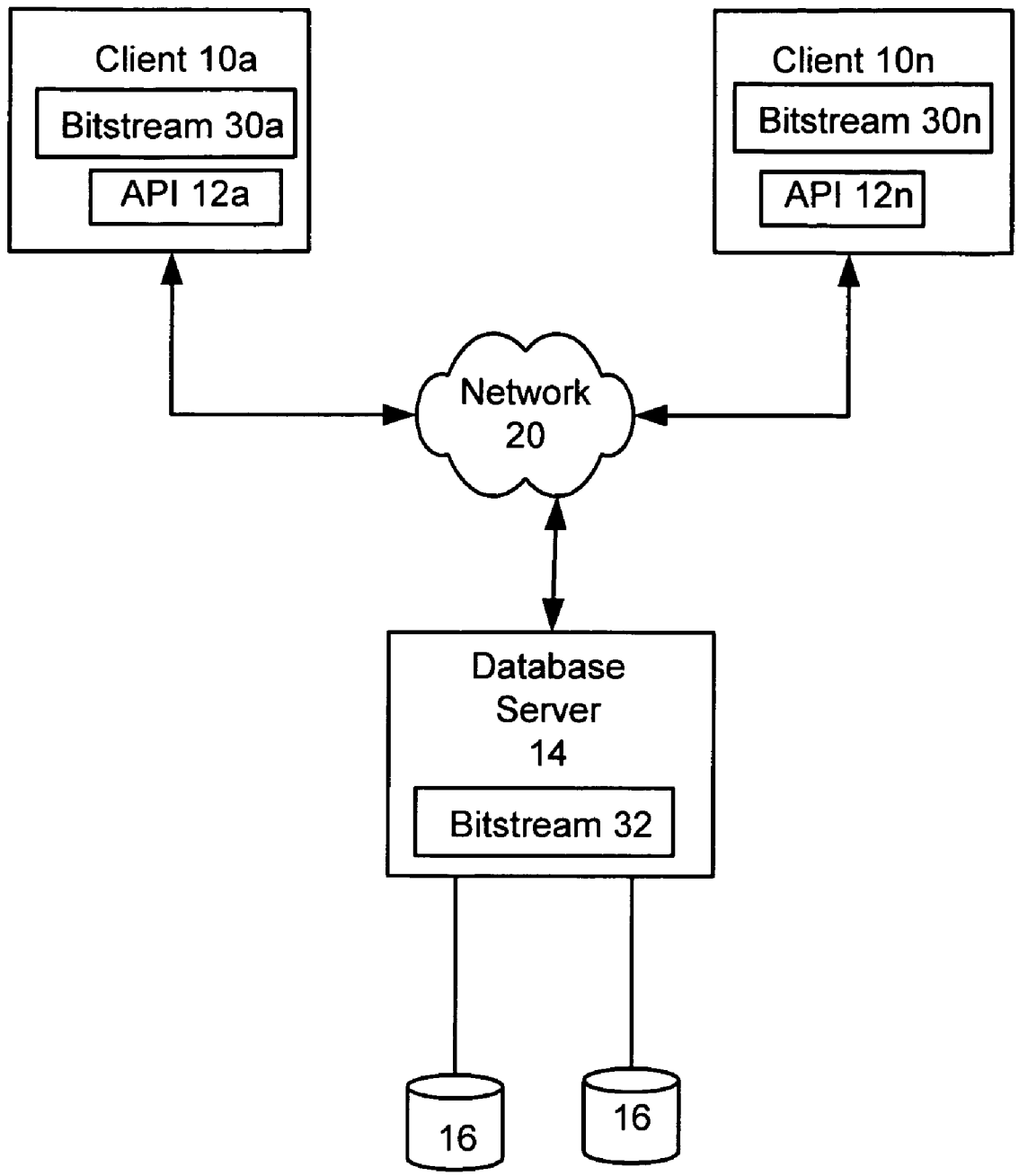
FIG. 1 illustrates a block diagram of a client/server environment according to a preferred embodiment of the present invention.
Figure 2:
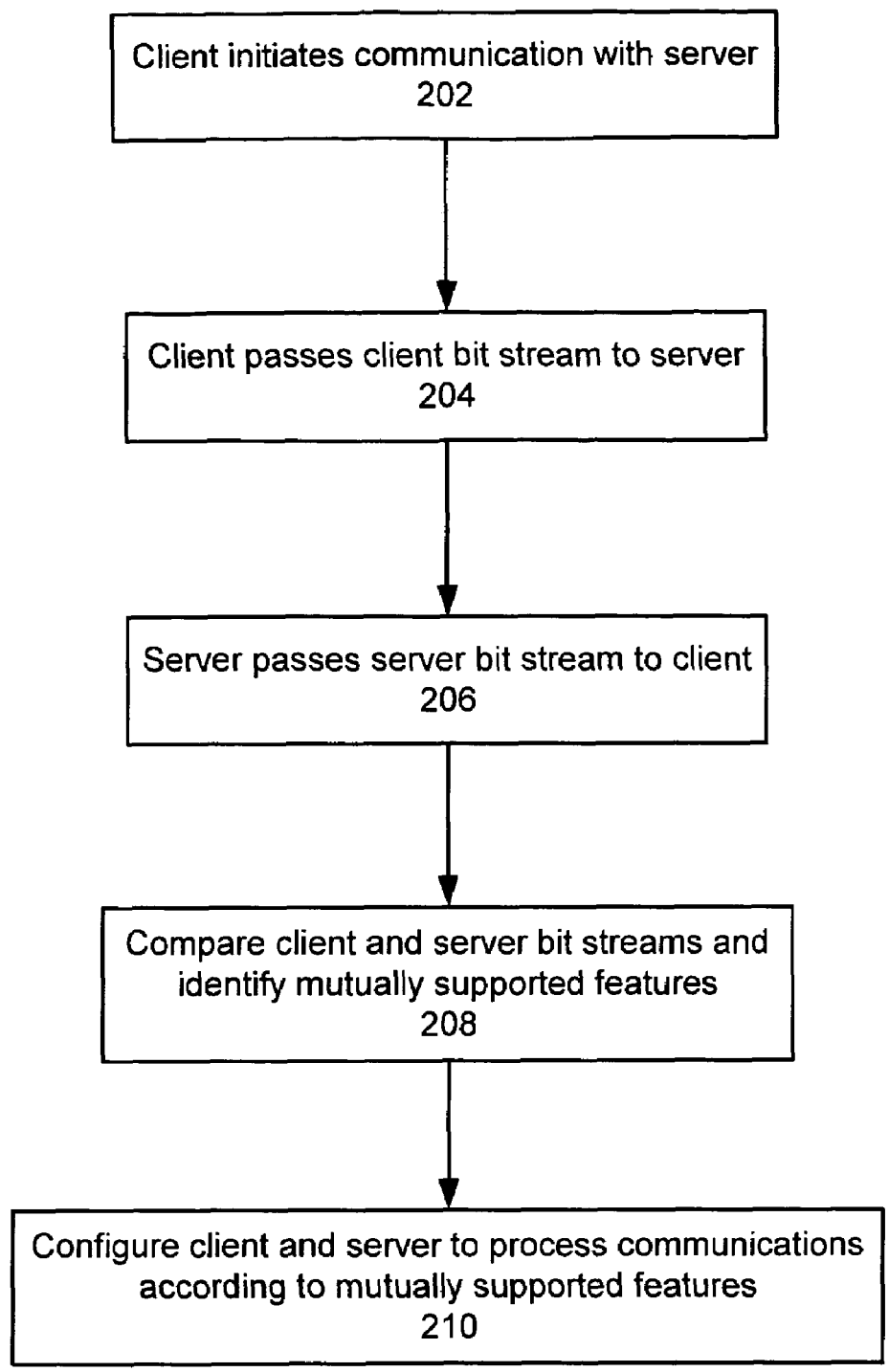
FIG. 2 is a flow chart illustrating a method for exchanging communication capabilities between a client API and a server according to a preferred embodiment of the present invention.

To describe more fully the aspects of the present invention, please refer now to FIG. 1 and FIG. 2, which is a flow chart illustrating a method for establishing a communication session between two devices, where the first device is a client API 12a and the second device is a database server 14 according to a preferred embodiment of the present invention. The method begins at step 202 when a client API, e.g., 12a, initiates communication with a server 14. Those skilled in the art readily appreciate that the server 14 can also be the communication initiator, e.g., the server 14 might publish messages to clients 10a-10n, and the following principles will apply equally.

In step 204, the communication initiator, in this case the client API 12a, transmits a bit stream 30a to the server 14 to indicate its capabilities to the server 14. Each bit represents a feature, where the leftmost bit represents the lowest functionality level (base level) and each successive feature is represented by a bit moving to the right in the bit stream. If a feature is supported by the client API 12a, its corresponding bit in the bit stream 30a is "on," i.e., the bit value is one (1). If a feature is not supported by the client API 12a, the corresponding bit is "off," i.e., the bit value is zero (0). For example, a two byte bit stream 30a "11111111 10100000" indicates that features 300 through 310, excluding feature 309, are supported.

After the client API 12a transmits its bit stream 30a to the server 14, the server 14 responds by transmitting its own bit stream 32 of capabilities to the client API 12a in step 206. Next, the client API 12a compares the server's bit stream 32 to its own bit stream 30a, and the server 14 does the same, to identify mutually supported features in step 208. In a preferred embodiment, a logical AND operation is performed between the bit streams 30a, 32. The client API 12a and server 14 then adapt their processing to utilize the resulting set of mutually supported features during the connection in step 210.

The following example illustrates a client/server communication scenario according to a preferred embodiment of the present invention. The following bit streams are exchanged:

Client Bit Stream: 11111010 11100000

Server Bit Stream: 11111110 10000000

Thus, the client supports features: 300, 301, 302, 303, 304, 306, 308, 309 and 310. The server supports features: 300, 301, 302, 303, 304, 305, 306, and 308. The logical AND of the two bit streams produces: "1111101010000000." Accordingly, the features that will be utilized during the connection are: 300, 301, 302, 303, 304, 306, and 308.

While the discussion above illustrates a single client API 12a communicating with a single server 14, those skilled in the art will readily appreciate that the client API 12a can establish multiple connections with multiple servers and that each connection can be defined by a different set of mutually supported features. The same can be said for a single server 14 communicating with several clients 10a-10n. Moreover, communications are certainly not limited to client/server communications; rather, a client can communicate with another client and a server can communicate with another server utilizing the principles described herein. Accordingly, the present invention is not limited to the one-to-one client/server scenario described above.

The present invention is related to a method and system for establishing a communication session between at least two devices. Through the aspects of the present invention, a bit stream is utilized to indicate the features supported by a device. According to the preferred embodiment of the present invention, a first device and a second device exchange their respective bit streams to indicate to one another their respective capabilities. By comparing the respective bit streams, the devices can agree to utilize the features they support in common. Accordingly, a device can implement and utilize new features without having to implement each of the predecessor features that may not be relevant to the particular device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for communicating application programming interface (API) capabilities supported by a database of a first device to one or more second devices for establishing communication between the first device and the one or more second devices, comprising the steps of:

generating a first bit stream having bits in a predetermined sequence successively arranged from lowest functional level to highest functional level to send from the first device to the one or more second devices, the first bit stream representing a highest API feature and intermediary API features installed on the first device, wherein the installed intermediary API features of the first device are not required to utilize the installed highest API feature;

receiving a second bit stream having bits in a predetermined sequence successively arranged from lowest functional level to highest functional level sent from one of the one or more second devices to the first device, the second bit stream representing a highest API feature and intermediary API features installed on the second device wherein the installed intermediary API features of the one of the one or more second devices are not required to utilize the installed highest API feature; and comparing the first and second bit streams in relation to the predetermined sequence at the first device and at the one of the one or more second devices to configure communications between the APIs for mutually supported API features, the mutually supported features including a highest API feature and one or more intermediary API features commonly installed to both the first device and the one of the one or more second devices, and, adapting processing to utilize a resulting set of the mutually supported API features during the communication between the first device and the one of the one or more second devices by installing the highest API feature of the second bit stream and only the intermediary API features of the second bit stream that are not already installed in the first device, wherein the first device and the one or more second devices communicate across a heterogeneous network, the first device and each of the one or more second devices are any of a client and server, and the API on the first and the one or more second devices comprises one or more of Open Database Connectivity (ODBC), Object Linking and Embedded Database (OLEDB) or Java Database Connectivity (JDBC).

2. The method of claim 1, wherein each bit in the first bit stream and the second bit stream has a value.

3. The method of claim 2, wherein each bit corresponds to an API feature.

4. The method of claim 3, wherein a feature is supported if the corresponding bit value is a one (1).

5. The method of claim 4, wherein a feature is not supported if the corresponding bit value is a zero (0).

6. The method of claim 4, wherein the comparing includes performing a logical AND operation between the first bit stream and the second bit stream.

7. The method of claim 1, wherein the comparing step includes performing a logical AND operation between the bit steams.

8. The computer readable medium of claim 1, wherein each bit in the first bit stream and the second bit stream has a value.

9. The computer readable medium of claim 8, wherein each bit corresponds to a feature.

10. The computer readable medium of claim 9, wherein a feature is supported if the corresponding bit value is a one (1).

11. The computer readable medium of claim 10, wherein a feature is not supported if the corresponding bit value is a zero (0).

12. The method of claim 1, further comprising:
sending the first bit stream to a third device; and receiving at the first device a third bit stream from a third device, the third bit stream representing a highest API feature and intermediary API features installed in an API of the third device.

13. A method for communicating capabilities supported by a first device to a plurality of second devices for establishing communication, comprising the step of:
receiving a first bit stream having bits in a predetermined sequence successively arranged from lowest functional level to highest functional level at each of the plurality of second devices from the first device, the bit stream representing a highest API feature installed and intermediary API features installed on the first device, wherein all of the intermediary API features are not required to utilize the highest API feature;
comparing the first bit stream and each of the plurality of second devices bit streams to determine a highest common API feature and to determine which of the intermediary API features need to be installed in the first device for communication with each of the plurality of second devices using the highest common API feature and common intermediary API features,
adapting processing to utilize a resulting set of the determined API features for each of communication as between the first bit stream and each of the plurality of second devices bit streams,
wherein the first device and each of the plurality of second devices communicate across a heterogeneous network, the first device and each of the plurality of second devices are any of a client and server, and the API on the first and each of the plurality of second devices comprises one or more of Open Database Connectivity (ODBC), Object Linking and Embedded Database (OLEDB) or Java Database Connectivity (JDBC).

* * * * *